United States Patent [19]

Antonini et al.

[11] Patent Number: 4,588,195
[45] Date of Patent: May 13, 1986

[54] FLOATING LIP SEAL ASSEMBLY WITH CONVOLUTED FLEXIBLE SECTION

[75] Inventors: Joseph Antonini, Chicago; Paul E. Gallo, Berwyn, both of Ill.

[73] Assignee: Dana Corporation, Toledo, Ohio

[21] Appl. No.: 800,862

[22] Filed: Nov. 22, 1985

[51] Int. Cl.$^4$ .............................................. F16J 15/32
[52] U.S. Cl. ..................................... 277/153; 277/166
[58] Field of Search ............... 277/152, 153, 166, 134, 277/157, 165

[56] References Cited

U.S. PATENT DOCUMENTS

| | | | |
|---|---|---|---|
| 3,653,670 | 4/1972 | Short et al. | 277/153 |
| 3,827,703 | 8/1974 | Brink | 277/153 |
| 3,917,286 | 11/1975 | Loyd | 277/153 |
| 4,021,049 | 5/1977 | Phelps et al. | 277/153 |
| 4,274,641 | 6/1981 | Cather | 277/153 |
| 4,360,208 | 11/1982 | Hill et al. | 277/153 |
| 4,449,717 | 5/1984 | Kitawaki et al. | 277/153 |
| 4,503,947 | 3/1985 | Heidmann et al. | 277/153 |

FOREIGN PATENT DOCUMENTS

| | | | |
|---|---|---|---|
| 711737 | 10/1941 | Fed. Rep. of Germany | 277/153 |
| 3307470 | 3/1984 | Fed. Rep. of Germany | 277/153 |
| 1024718 | 1/1953 | France | 277/153 |
| 56-55758 | 5/1981 | Japan | 277/153 |
| 621526 | 4/1949 | United Kingdom | 277/134 |

Primary Examiner—Robert S. Ward
Attorney, Agent, or Firm—Frank B. McDonald

[57] ABSTRACT

An annular shaft seal of the type including a continuous lip seal element for sealing against oil flow through and between a bore and a shaft extending therethrough includes a convoluted elastomeric flexible section which connects the sealing element with a rigid case support. The flexible section is defined by a plurality of annuli, wherein the first annuli contains the sealing element which is supported from a rear body portion, both sealing element and rear body portions being integral to the first annuli. A second annulus integrally coupled to the first annulus through a reverse bend has a radial thickness less than the thickness of the first annulus. In the preferred form, the rear body portion contains an annular groove in which is supported a circumferentially extending garter spring. A pair of spaced projections extends partially circumferentially about the coil dimension of the garter spring so as to enclose at least 200° to 270° of the garter spring coil circumference. The resultant radially floating shaft lip seal will accommodate eccentricities substantially greater than shaft lip seals of the prior art and will enhance garter spring retention under the dynamics associated with extreme eccentricities.

10 Claims, 2 Drawing Figures

FLOATING LIP SEAL ASSEMBLY WITH CONVOLUTED FLEXIBLE SECTION

BACKGROUND OF THE INVENTION

This invention relates to annular shaft seals of the type including continuous lip sealing elements. Such elements are disposed for sealing against oil flow through and between rotary shafts and associated housing bores, as in the case of a crankshaft and associated crankcase bore. More particularly, the invention relates to accommodation of radial shaft movements as associated with runout and misalignment eccentricities which typically cause premature failures in such seal systems.

There are numerous prior art annular shaft seal assemblies designed for accommodating shaft runout and misalignment in rotating shaft environments. Many of such assemblies provide for flexible sections which connect sealing elements with rigid case supports normally affixed to housing bores. The flexible sections afford a float capability to permit radial movement of a shaft relative to the rigid case support; however, the available systems fail to accommodate relatively extreme eccentricities over substantial periods of time.

In addition, most available prior art systems afford some type of garter spring arrangement about the rear surface of the lip sealing element body for effecting pressure to force the lip against the rotary shaft. Such systems do not, however, provide means for ensuring that the garter spring will remain in place during extreme radial movements of the associated crank shaft. Thus, improved flexible sections are desirable in order to enhance the eccentricity capacities to which the shafts may be subjected, and to provide means to retain garter springs about the rear surface portions of the continuous lip sealing elements under extreme eccentricity conditions.

SUMMARY OF THE INVENTION

The invention disclosed and described herein provides a shaft seal assembly disposed for accommodating shaft eccentricities in excess of 0.030 inch. Moreover, the improved shaft seal assembly of the present invention incorporates a convoluted flexible section which provides a radial float capability sufficient to hold constant, under conditions of extreme eccentricity, both the angle of the lip relative to the shaft as well as the amount of axial offset between the lip and centerline of the spring. In addition, the shaft seal assembly of the present invention provides a pair of annular ribs or projections which surroundingly engage a sealing lip garter spring over a range of 200° to 270° of the spring coil circumference.

In a preferred form, the invention provides an annular shaft seal having a sealing element disposed for continuous circumferential contact with the shaft, the sealing lip being supported on an elastomeric body encircled by a garter spring. The improved seal assembly includes a first annulus from which the sealing element extends, a second annulus integrally coupled to the first annulus through a first reverse bend, the second annulus flexibly disposed for angular movement with respect to the shaft axis. A third annulus is integrally connected through a second reverse bend to the second annulus, extends parallel to the shaft axis, and is rigidly affixed to a metallic support case. The reverse bend between the second and third annuli is preferably approximately one third less the thickness of the first reverse bend.

The assembly provides the sealing lip with a superior radial float capability for movement with the shaft relative to the case support. At the same time, a constant angle between the sealing lip and shaft is maintained as is also a constant offset between the sealing lip and centerline of the spring. The seal assembly will therefore accommodate substantial eccentricity, while avoiding typical sealing lip distortion on the "high" side of the shaft with concurrent loss of sealing contact on the opposite "low" side.

DESCRIPTION OF A PREFERRED EMBODIMENT

Figure 1:
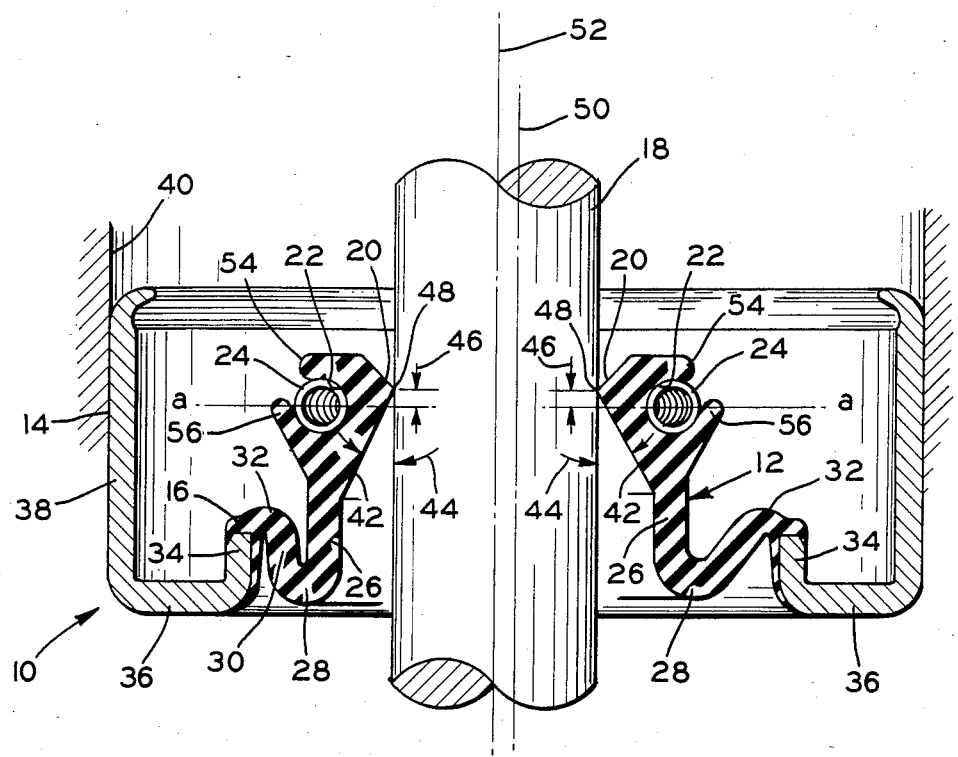
FIG. 1 is a cross-sectional view of a floating shaft lip seal assembly constructed in accordance with the present invention.

Referring initially to FIG. 1, a seal assembly 10 includes an elastomeric convolute flexible body portion 12 molded as shown at 16 to an annular rigid metallic case 14. A rotary shaft 18, as for example a crankshaft, is encircled by the elastomeric body portion 12. Although all references to the shaft 18 are as a crankshaft, the seal assembly 10 of this invention may be amenable to driveshafts, rear wheel axle shafts, pinion shafts, and numerous other automotive as well as non-automotive shafts.

The body portion 12 contains a sealing lip 20 which engages the shaft 18 in a circumferential line contact about the shaft. The body portion 12 also contains a groove 22 formed radially outwardly of the sealing lip 20. The groove is disposed for accommodating a pressure control spring 24, which in the preferred embodiment is a garter spring.

The convolute flexible body portion 12 contains a first annulus 26 which is of a material thickness to ensure a fairly rigid and hence radially fixed relationship with respect to the sealing lip 20. A second annulus 30 is joined by a first reverse bend 28 to the first annulus 26, wherein the second annulus 30 is disposed for angular movement relative to, and hence flexible accommodation of, the first annulus 26 as the latter is shifted radially back and forth under shaft eccentricity conditions. As noted in FIG. 1, the cross-sectional view of the second annulus 30 on the left hand side of the shaft 18 is shown in a compressed mode. The cross-sectional view of the second annulus 30 on the right side of the shaft 18 depicts the opposite side of the annulus in an extended mode. The figure thus depicts the manner in which the second annulus 30 will accommodate a radial shift of the shaft 18 to a displacement center line 52 from its normal shaft center line 50.

As earlier noted, the second annulus 30 is joined at 16 to the case 14 through a second reverse bend 32. For this purpose, the rigid metallic case 14 contains an axially extending inside annulus 34 to which the elastomeric body portion 12 is molded. The inside annulus 34 depends from a radially extending annulus 36 which is integral to the axially extending outer body 38 of the case 14. The outer body 38 is press fit into a bore 40, as for example an engine crankcase bore.

The seal assembly 10 contains an air side surface 42 adjacent the sealing lip 20. In the preferred form, the surface has an angle 44 with respect to the shaft 18 of approximately 20° to 30°. Also in the preferred form it will be noted that the garter spring 24 has a center line "a—a" which is offset as shown at 46 from the contact point 48 of the sealing lip 20 on the shaft 18. As those skilled in the art will appreciate, both the angle 44 and the offset 46 are normally predetermined for the design of a particular seal, and it is important that the values remain as nearly constant as possible during shaft rotation for effectiveness of the sealing lip 20.

As earlier noted, the second reverse bend 32 has preferably one third less the thickness of the first reverse bend 28 to enable the second annulus 30 to flex appropriately, as shown. In the preferred practice of the invention, the reverse bend 32 may have a thickness in the range of 25 to 50% less than the thickness of the reverse bend 28 for this purpose.

It will be appreciated that the present invention provides a means by which the stated lip to shaft contact parameters may be held virtually constant through the nature of the elastomeric convolute flexible body portion 12, as related to the ability of the latter to accommodate radial float or displacement. As earlier noted, the normal shaft center line 50 will shift to a maximum eccentricity displacement center line 52 during shaft rotation. In extreme cases, the total displacement value will exceed 0.030 inches. The presently preferred embodiment provides a sealing system which accommodates a total eccentricity of 0.060 inches for periods beyond 4000 hours.

Finally, this invention includes a provision for improved retention of the garter spring 24 under the dynamic vibration conditions of extreme eccentricities. For this purpose a pair of outer and inner annular projections 54 and 56, respectively, extend about the groove 22 to surroundingly engage the spring 24 over a range of 200° to 270° of the coil circumference of the spring. In the preferred embodiment the inner projection 56 is greater than the outer projection 54 to facilitate spring insertion.

Figure 2:
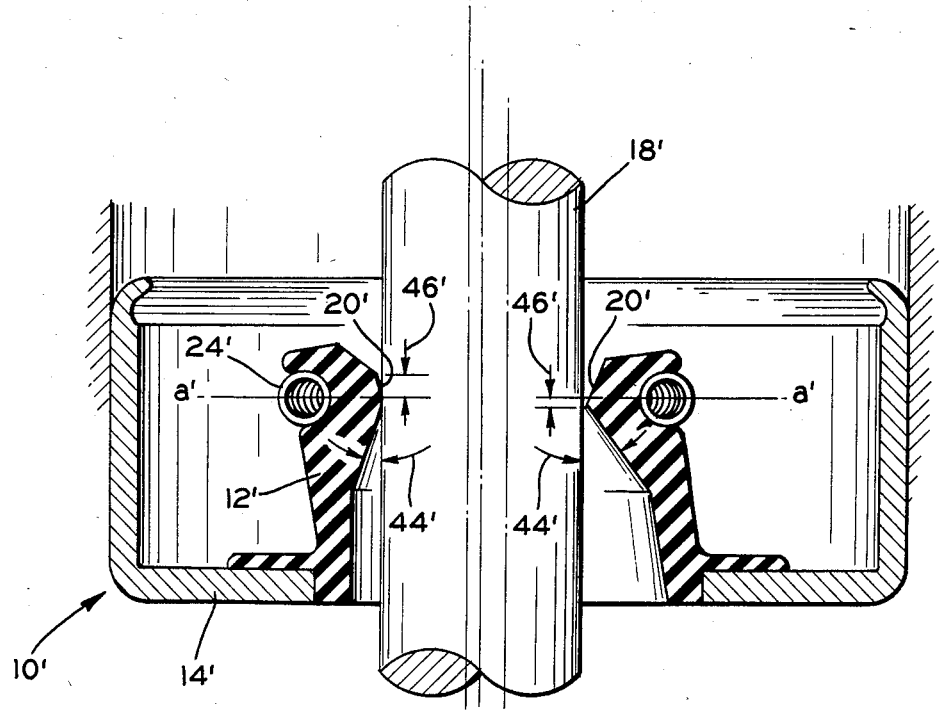
FIG. 2 is a prior art lip seal assembly.

For purposes of comparison, FIG. 2 depicts a shaft seal system of the prior art which has been replaced by the assembly 10 of the present invention. Thus, a seal assembly 10' contains elastomeric portion 12' fixed to a rigid case 14'. The portion 12' contains a sealing lip 20' shown engaging a shaft 18'. However, the assembly 10' does not contain a convolute flexible body system, and under conditions of extreme eccentricity, the shaft will distort one side of the sealing lip 20' while breaking contact with the other side of the sealing lip, as shown at left and right sides of the shaft, respectively.

Even under conditions of less than extreme eccentricity, it is apparent from FIG. 2 that the angle 44 will vary about the circumference of the shaft 18', as indicated at left and right sides of the shaft, respectively. Moreover, the offset 46' between the lip 20' and spring centerline a'—a' will vary about the shaft, resulting in different contact pressures around the shaft periphery. The present invention overcomes both of these deficiencies.

Although only one presently preferred embodiment of this invention is shown and described herein, the following claims are envisioned to cover numerous other embodiments which may fall within the spirit and scope thereof.

What is claimed is:

1. In an annular shaft seal of the type including a continuous sealing lip disposed for sealing against oil flow through and between a bore and a shaft extending therethrough, said seal having a rigid case support disposed for engaging said bore, an annular flexible portion connecting said sealing element with said case support to provide radial float of said lip with respect to the shaft relative to said case support; an improvement comprising: a first annulus from which said sealing element extends, said first annulus extending parallel to the axis of said shaft, a second annulus integrally coupled to said first annulus through a first reverse bend, said second annulus radially extensible relative to said axis, and a third annulus integrally connected through a second reverse bend to said second annulus, said third annulus extending parallel to said axis and rigidly affixed to said case support, said second reverse bend having a radial thickness less than the thickness of said first reverse bend.

2. The annular shaft seal of claim 1 further comprising spring means supported radially outwardly of said sealing lip, said spring means urging said sealing element radially inwardly against said shaft.

3. The annular shaft seal of claim 2 wherein said spring means comprises a circumferentially extending garter spring.

4. The annular shaft seal of claim 3 wherein said second reverse bend has a radial thickness in the range of 25–50% less than the thickness of said first reverse bend.

5. The annular shaft seal of claim 4 further comprising a rear body portion positioned radially outwardly of said sealing element, said rear body portion supporting said sealing element and being integral therewith, said rear body portion defining annular groove, said groove bounded by a pair of annular projections disposed for containing said garter spring within said groove.

6. The annular shaft seal of claim 5 wherein said projections provide an enclosure of said garter spring in said groove, said projections providing a partial circumferential enclosure of said garter spring, said enclosure being in a range of 200°–270° about the coil dimension of said spring.

7. The annular shaft seal of claim 6 wherein said rigid case comprises a metallic material.

8. The annular shaft seal of claim 7 wherein said sealing element, said rear body portion supporting said sealing element, and said first, second, and third integral annuli and said second connecting reverse bends comprise a unitary, molded body of elastomeric material.

9. The annular shaft seal of claim 8 wherein said rigid case comprises a first elongated cylindrical portion, a radial flange depending from one end of said first cylindrical portion, and a second shorter cylindrical portion depending from said flange, said second cylindrical portion being annularly spaced from said first cylindrical portion, said second cylindrical portion supporting said third annulus of said elastomeric body.

10. The annular shaft seal of claim 9 wherein said rear body portion and said sealing element are directly and integrally affixed to said first annulus of said elastomeric body.

* * * * *